Oct. 21, 1947.    S. I. NEWTON    2,429,367
ANIMAL TRAP
Filed March 27, 1945    2 Sheets-Sheet 1

INVENTOR.
Sir I. Newton
BY Lomaster, Allwine & Rommel
ATTORNEYS.

Oct. 21, 1947.     S. I. NEWTON     2,429,367
ANIMAL TRAP
Filed March 27, 1945     2 Sheets-Sheet 2
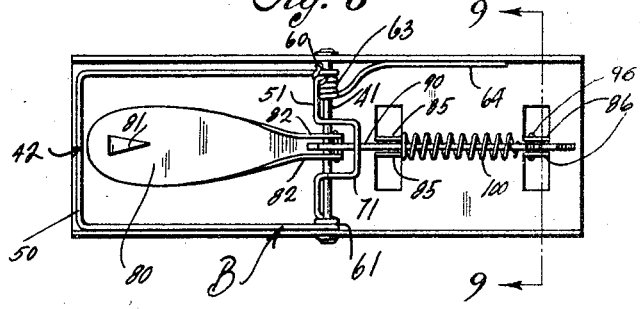
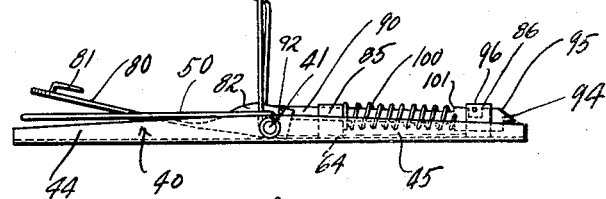
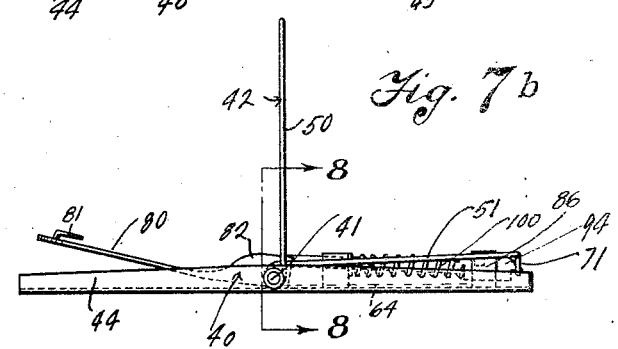
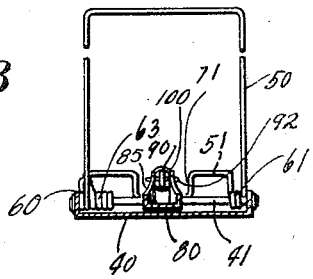
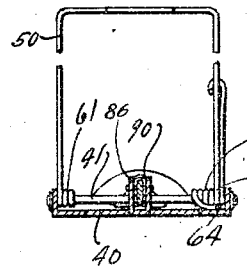
INVENTOR.
Sir I. Newton
BY Lancaster, Allwine Rommel
ATTORNEYS.

Patented Oct. 21, 1947

2,429,367

UNITED STATES PATENT OFFICE 2,429,367

ANIMAL TRAP

Sir Isaac Newton, Vernal, Utah

Application March 27, 1945, Serial No. 585,058

3 Claims. (Cl. 43—83.5)

This invention relates to improvements in animal traps.

The primary object of this invention is the provision of an animal trap which may be handled with safety and ease, and the parts of which are very simple and durably constructed.

A further object of this invention is the provision of a rodent trap having a jaw which may be set with an operator's foot; thus avoiding the necessity of handling the same. The release of the jaw may be accomplished in the same manner to release the trapped rodent.

A further object of this invention is the provision of an animal trap having an improved trigger arrangement.

Other objects of the invention will be apparent from the following detailed description.

In the accompanying drawings, forming a part of this specification, and wherein similar reference characters designate corresponding parts thruout the several views, Figure 1 is a plan view of one form of the improved animal trap.

Figure 6 is a plan view of another form of trap.

Figure 7a is a side elevation of the trap of Figure 6 in sprung position.

Figure 7b is a side elevation of the trap of Figure 6 with the jaw in "set" position.

Figures 8 and 9 are cross sectional views taken substantially on the respective lines shown in Figures 7b and 6 of the drawings.

Figure 1:
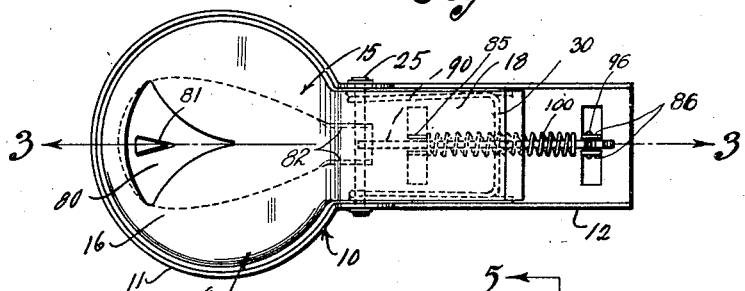
Figure 2:
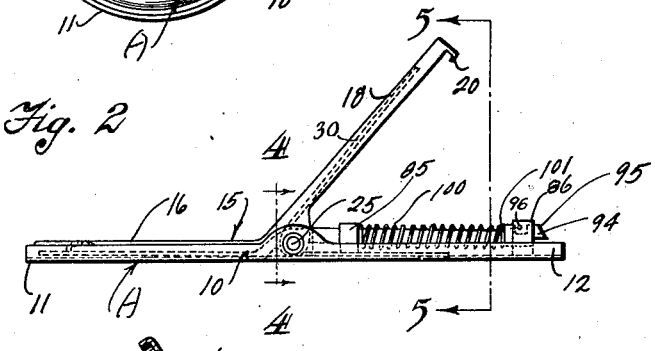
Figure 2 is a side elevation of the improved animal trap showing the sprung position of the jaw.

In the drawings, wherein for the purpose of illustration are shown different forms of the invention, the letters A and B may generally designate two forms of the invention which embody substantially identical characteristics, with the exception of the frame and jaw structures.

In the form of trap A a base 10 is provided having the cupped disc-shaped portion 11 upon which the animal is adapted to be trapped. It is preferably circular in plan but may be rectangular or any desired shape. Radiating therefrom is the base portion 12 upon which the trigger arrangement is mounted. The material out of which the base is constructed may vary. It can be copper, other metal, plastic or any desired material.

The jaw structure 15 preferably comprises the main jaw 16 and the trigger cooperating portion 18. These parts 16 and 18 are in angled relation, preferably greater than 90° with respect to each other, as will be noted from the drawings. The jaw part 16 is disc-shaped and cupped in facing cooperating relation with respect to the base part 11. The part 18 radiates in angled relation from the part 16 and likewise may be cupped or provided with side flanges. At its end it is provided with a trigger cooperating lip. 20.

The upwardly flanged portions of the base 10 at the end of the base portion 12 adjacent the base part 11 is provided with a pivot pin 25. The part 18 of the jaw is provided with ears which are apertured for pivoting upon pin 25 inside of the side flanges of the base.

Figure 3:
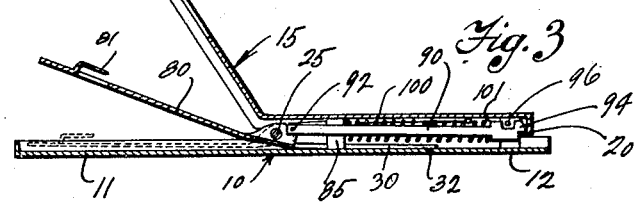
Figure 3 is a longitudinal cross section taken substantially along the line 3—3 of Figure 1 but showing the jaw in "set" position.
Figure 4:
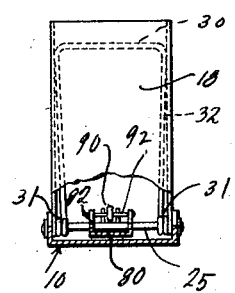
Figures 4 and 5 are cross sectional views taken substantially on their respective lines shown in Figure 2 of the drawings.
Figure 5:
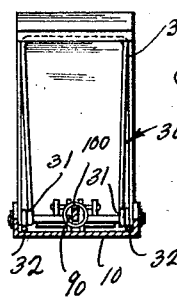

Cooperating with the base and the jaw structure is a spring arrangement adapted to normally urge the jaw part 16 into trapping position upon the base part 11. This spring structure, generally designated at 30 in the drawing, includes a U-shaped arrangement cooperating against the jaw part 18 between the side flanges thereof; the ends of the arms of this U-shaped part being coiled at 31 around the pin 25 and extended therefrom upon the base part 12, as shown at 32 in Figures 3 and 5 of the drawing. The coils of this spring are tensioned so that the base and jaw parts 12 and 18 are normally forced apart.

Inasmuch as the trigger and bait arm structures of both forms of traps are substantially identical, reference will now be made to the frame structure of the form of trap B. This consists of a base 40 which intermediate its ends is provided with a pivot 41 upon which the jaw structure 42 is pivoted. The base 40 includes the part 44 at one side of the pivot 41 upon which the animal is trapped and the part 45 which supports the trigger arrangement as will be subsequently described. The sides of the base are flanged thruout the length and in these flanges the pivot 41 is supported.

The jaw structure 42 is preferably formed of wire, including the jaw proper 50 and the part 51 adapted to cooperate with the trigger in shutting the jaw. The wire of which this jaw structure is formed preferably is arranged as follows: one end is coiled at 60 around the pivot pin 41 at one side of the base and extends therefrom in a U-shaped arrangement which defines the jaw bail 50 above described. The other arm of the latter is then coiled at 61 a number of convolutions around the opposite end of the pin 41 and therefrom the wire extends to provide the U-shaped trigger cooperating portion 51; the opposite end of the latter being coiled a number of convolutions at 63 around the pin 41 adjacent to the coil 60. The extreme end of the coil 63, designated at 64 in Fig. 6, rests upon the base part 45, as shown in Figure 6. The coils 61 and 63 are under tension normally urging the jaw part 50 into the position shown in Figures 6 and 7a of the drawings, which, of course, is a trapping position.

The free end of the trigger cooperating part 51 of the jaw structure is provided with a depending U-shaped lip 71 adapted to cooperate with the trigger, as will be subsequently described.

Referring to the trigger and bait supporting arm structure of both forms of the invention A and B, the bait holding arm or member 80 is of elongated construction preferably rather oval at its free end and there provided with a detent 81 for holding the bait. At its opposite end it is narrowed and provided with upwardly extending flanges 82 suitably apertured for receiving the pivot pin of the trap and by means of which the bait holders are pivoted along the longitudinal axes of the trap.

Referring to the trigger structure, the trigger for each form of trap consists of a narrow trigger arm or body 90 which at one end is pivoted on a pin 92 forwardly of and eccentric to the jaw pivot pin of the trap; this end of the trigger being extended between the flanged portions 82 of the bait holder arm, as clearly shown in the drawings.

To support the sliding action of the trigger arm, each form of trap is preferably provided with guide flanges 85 near the pivot end of the trigger spaced to provide a slot within which the trigger arm slides, and also a forward pair of guide flanges 86 between which the outer or detent end of the trigger arm slides. These flanges 85 and 86 may be affixed in any approved manner to the base structures of the traps, but in the preferred instance they are struck from the metal of the base, which provides a very economical method of fabricating the trap.

The triggers 90 at their fore ends are provided with detents 94 having sloping surfaces 95 against which the lips 20 and 71 of the trap may cooperate in order to automatically set the trigger. The lips operate with a cam action on the sloping surfaces 95 so that the detents 94 may be moved to a position where they will engage the lips 20 and 71.

In order to prevent the fore ends of the triggers from rising between the flanges 86, the latter may be provided with a retaining pin 96 mounted on the flanges, the trigger being notched so that the trigger may move back and forth a sufficient distance between its rest and detaining positions.

A compact and efficient manner of normally urging the trigger to a jaw restraining position consists of placing around each trigger arm a coiled spring 100; one end of which engages the flanges 85, and the opposite end of which engages in a notch or other restraining portion 101 at the fore end of the trigger 90. These springs are under compression and normally urge the detent end 94 outwardly. Due to the eccentric pivoting of these triggers 41, this also brings the bait holding arm 80 into set position.

Referring to operation of the form of trap A, it will be noted (in its rest or sprung position) the jaw portion 18 is inclined at an angle between the vertical and horizontal. In this position the operator may place his foot, or some instrumentality, upon the top of the part 18 and by pressing downwardly force the part 18 downwardly, so that the lip 20 will engage the detent end of the trigger, and move the detent end beneath the lip 20 for holding the jaw in "set" position. In the form of invention A, due to the disc-like formation of the jaw part 16 the spring action upon the jaw is such that the detent is not normally set when the jaw is sprung, but as the jaw is moved downwardly the spring 100 will move the detent into a position where the lip will be engaged by the detent of the trigger as the part 18 is moved to final position. In this arrangement of parts the jaw proper 16 is in position to trap a rodent attempting to remove a bait from the arm 80. Only a slightly downward or wiggling movement of the arm 80 is necessary to move the trigger so that the detent will release the jaw structure and, of course, the spring will then snap the jaw into sprung position for trapping the rodent.

The action of the form of invention B is the same as the form A, except that the spring of the trigger regardless of the position of the jaw parts, holds the bait arm in a set position, with the trigger in position to engage the detent when the lip 71 slides downwardly over the edge 95.

It is an important feature of this invention that no part of the detent or trigger structure in either form projects upwardly above the top surface of the lip supporting portion.

The cupped shaped arrangement of the bases and the jaw of form A assist in holding the trapped animal.

Various changes in the shape, size and arrangement of parts may be made to the forms of invention herein shown and described, without departing from the spirit of the invention or the scope of the following claims.

I claim:

1. In a rodent trap the combination of a base structure, a jaw structure pivoted on the base structure including a jaw proper and an arm portion rigidly connected thereto having a detent engaging lip thereon, means normally urging the jaw structure to a rodent trapping position, a bait holder, a trigger arm reciprocably mounted upon the base having an end pivoted to the bait holder eccentric to the pivot of the bait holder, said trigger arm having a detent for engaging the lip of said jaw arm to hold the jaw structure in set position, and a spring mounted upon said trigger and normally urging the latter into retaining position with respect to said lip.

2. In a rodent trap the combination of a base structure, a jaw structure pivoted to the base structure including a jaw proper and an arm portion rigidly connected thereto having a detent engaging lip thereon, means normally urging the jaw structure to a rodent trapping position, a bait holder, a trigger arm reciprocably mounted upon the base having an end pivoted to the bait holder eccentric to the pivot of the bait holder, said trigger arm having a detent for engaging the lip of said jaw arm, and a spring normally urging the latter into retaining position with respect to said lip, said lip and the detent of the trigger being so related with respect to the jaw arm that when the jaw proper is in set position no part of the lip or detent end of the trigger will project above the top of the jaw arm at the free end of the latter.

3. In an animal trap the combination of a base, a jaw structure pivoted upon the base including a jaw proper and an arm connected in angled relation with respect to the jaw proper, means normally urging the jaw structure to a rodent trapping position, a bait holder and trigger structure, said trigger structure having a detent end and the jaw arm being provided with a lip for cooperating with the detent end to hold the jaw proper in set position, a spiral spring mounted upon said trigger having an end engaging the base and the opposite end engaging the trigger to normally force the detent end of the latter into jaw arm lip cooperating position.

SIR ISAAC NEWTON.

REFERENCES CITED

The following references are of record in the file of this patent:

UNITED STATES PATENTS

| Number | Name | Date |
| --- | --- | --- |
| 1,462,739 | Champlin | July 24, 1923 |
| 1,919,527 | Orr | July 25, 1933 |

FOREIGN PATENTS

| Number | Country | Date |
| --- | --- | --- |
| 420,243 | Great Britain | Nov. 28, 1934 |